United States Patent
Hasegawa et al.

(10) Patent No.: US 11,604,469 B2
(45) Date of Patent: *Mar. 14, 2023

(54) ROUTE DETERMINING DEVICE, ROBOT, AND ROUTE DETERMINING METHOD

(71) Applicant: Honda Motor Co., Ltd., Tokyo (JP)

(72) Inventors: Yuji Hasegawa, Saitama (JP); Sango Matsuzaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 202 days.

This patent is subject to a terminal disclaimer.

(21) Appl. No.: 16/820,738

(22) Filed: Mar. 17, 2020

(65) Prior Publication Data

US 2020/0310444 A1 Oct. 1, 2020

(30) Foreign Application Priority Data

Mar. 25, 2019 (JP) .............................. JP2019-057103

(51) Int. Cl.
 *G05D 1/02* (2020.01)
 *G05D 1/00* (2006.01)
 (Continued)

(52) U.S. Cl.
 CPC ....... *G05D 1/0214* (2013.01); *G01C 21/3453* (2013.01); *G05D 1/0088* (2013.01); *G05D 1/0238* (2013.01); *G06N 3/08* (2013.01)

(58) Field of Classification Search
 None
 See application file for complete search history.

(56) References Cited

U.S. PATENT DOCUMENTS

2016/0299509 A1   10/2016   Ueda et al.
2018/0012370 A1*   1/2018   Aghamohammadi .   G01C 11/04
 (Continued)

FOREIGN PATENT DOCUMENTS

JP   2004029562   7/2004
JP   2005172628   6/2005
 (Continued)

OTHER PUBLICATIONS

Fox et al. "The dynamic window approach to collision avoidance", Mar. 1997, IEE Robotics & Automation Magazine, vol. 4 Issue: 1, pp. 23-33 (Year: 1997).*

(Continued)

*Primary Examiner* — Sze-Hon Kong
*Assistant Examiner* — Davin Seol
(74) *Attorney, Agent, or Firm* — JCIPRNET

(57) ABSTRACT

This disclosure provides a route determining device capable of determining a route of a moving device such that the moving device smoothly moves to a destination while avoiding an interference with a traffic participant even in a congested traffic environment. A route determining device 1 determines a provisional movement velocity command v_cnn such that an interference between a robot 2 and traffic participants is avoided using the CNN, determines a distance dist between the robot 2 and the traffic participant closest to the robot 2 when the robot is assumed to move from the current position by a command v_cnn in accordance with the reliability P of the command v_cnn, and determines a movement velocity command v of the robot using a DWA such that a target function G including the distance dist and the movement velocity command v of the robot as independent variables has a maximum value.

9 Claims, 11 Drawing Sheets

(51) Int. Cl.
*G06N 3/08* (2023.01)
*G01C 21/34* (2006.01)

(56) References Cited

U.S. PATENT DOCUMENTS

| | | | | |
|---|---|---|---|---|
| 2019/0094866 A1* | 3/2019 | Moore | ............... | B60W 30/08 |
| 2019/0113927 A1* | 4/2019 | Englard | ............... | G05D 1/0221 |
| 2020/0139967 A1* | 5/2020 | Beller | ............... | G05D 1/0223 |
| 2020/0298891 A1* | 9/2020 | Liang | ............... | G06N 20/00 |
| 2021/0325894 A1* | 10/2021 | Faust | ............... | G06N 3/0454 |

FOREIGN PATENT DOCUMENTS

| | | |
|---|---|---|
| JP | 2006113627 | 4/2006 |
| JP | 2007179348 | 7/2007 |
| JP | 2009110495 | 5/2009 |
| JP | 2012200818 | 10/2012 |
| WO | 2015072002 | 5/2015 |
| WO | 2017002258 | 1/2017 |
| WO | 2018084324 | 5/2018 |

OTHER PUBLICATIONS

"Office Action of Japan Counterpart Application" with English translation thereof, dated Nov. 8, 2022, pp. 1-6.
Office Action of China Counterpart Application, with English translation thereof, dated Jan. 28, 2023, pp. 1-19.

* cited by examiner

ROUTE DETERMINING DEVICE, ROBOT, AND ROUTE DETERMINING METHOD

CROSS REFERENCE TO RELATED APPLICATIONS

This application claims the priority benefit of Japanese Patent Application No. 2019-057103, filed on Mar. 25, 2019. The entirety of the above-mentioned patent application is hereby incorporated by reference herein and made a part of this specification.

BACKGROUND

Technical Field

The present disclosure relates to a route determining device and the like determining a route of a moving device such as a robot.

Description of Related Art

Conventionally, a route determining device determining a route of a robot as in a moving device disclosed in Patent Document 1 is known. In this route determining device, an interference likelihood time, at which it is predicted that there will be a likelihood of interference of the robot with a traffic participant, is calculated on the basis of the velocity of the traffic participant such as a pedestrian, and a virtual obstacle area to which the traffic participant is assumed will move after a predetermined time. Then, the route of the robot is determined on the basis of the interference likelihood time and the virtual obstacle area. In this way, an interference between the robot and the traffic participant is avoided.

PATENT DOCUMENTS

[Patent Document 1] Japanese Patent Laid-Open No. 2009-110495

SUMMARY

According to the conventional route determining device described above, since the interference likelihood time and the virtual obstacle area of each of traffic participants are used, when an actual traffic participant such as a pedestrian moves in a locus that cannot be predicted, a state in which the robot and the traffic participant interfere with each other frequently occurs. As a result, a state in which the robot stops frequency occurs, and there is a problem in that the marketability thereof is low. Particularly, in a traffic environment in which there is congestion, this problem becomes notable.

The disclosure provides a route determining device and the like capable of determining a route of a moving device such that the moving device smoothly moves to a destination while avoiding interference with traffic participants even in a traffic environment such as a congested one.

A route determining device according to an embodiment is a route determining device determining a route when a moving device moves to a destination in conditions in which traffic participants are present in a traffic environment before reaching the destination, the route determining device including: a predicted route determining unit that determines a predicted route that is a result of prediction of a route of the moving device using a predetermined prediction algorithm such that interference between the moving device and the traffic participants is avoided; a reliability calculating unit that calculates a reliability of the predicted route; a distance determining unit that determines a traffic participant distance that is a distance between the moving device and a traffic participant closest to the moving device when the moving device is assumed to move from a current position along the predicted route in accordance with the reliability of the predicted route; and a route determining unit that determines the route of the moving device using a predetermined control algorithm such that a target function including the traffic participant distance and a velocity of the moving device as independent variables has a maximum value.

According to this route determining device, a predicted route that is a result of prediction of a route of the moving device is determined using a predetermined prediction algorithm such that an interference between the moving device and traffic participants is avoided. In addition, a reliability of the predicted route is calculated, and a traffic participant distance that is a distance between the moving device and a traffic participant closest to the moving device when the moving device is assumed to move from a current position along the predicted route is determined in accordance with the reliability of the predicted route. Then, the route of the moving device is determined using a predetermined control algorithm such that a target function including the traffic participant distance and a velocity of the moving device as independent variables has a maximum value. In this way, the route of the moving device is determined using the traffic participant distance determined in accordance with the reliability of the predicted route. Accordingly, the route of the moving device is determined to be the predicted route or a route close thereto when the reliability of the predicted route is high and is determined to be a route different from the predicted route when the reliability of the predicted route is low.

Accordingly, even under a traffic condition such as a congested one in which an error in the predicted route increases, the route of the moving device can be determined such that the moving device of an autonomous movement type smoothly moves to the destination while avoiding an interference with traffic participants. As a result, the marketability of the moving device can be improved (in addition, "determining of the route of the moving device" stated here includes sequentially determining values (for example, a movement velocity command to be described later) representing a movement direction and a movement velocity of the moving device in a predetermined control period; furthermore, "traffic participants" stated here include unmovable obstacles in addition to movable targets such as pedestrians and vehicles and are not limited to outdoor targets and also include indoor targets; in addition, "traffic environment" is not limited to an environment when moving outdoors and also includes an environment when moving indoors).

According to an embodiment of the present disclosure, in the route determining device according to the embodiment described above, the predetermined prediction algorithm may be a neural network, and the reliability calculating unit calculates a variation parameter representing a variation in an output of the neural network and calculates the reliability using a model representing a relation between the variation parameter and the reliability.

According to this route determining device, the reliability is calculated using a model representing a relation between a variation parameter representing a variation in the output of the neural network and the reliability. In this case, since the variation in the output of the neural network represents a modeling error, in other words, a prediction error of the neural network, by using the model representing the relation between the variation parameter and the reliability, the reliability of the predicted route can be calculated with high accuracy.

According to an embodiment of the disclosure, in the route determining device described above, the distance determining unit calculates magnitudes of cost values of a plurality of cells on the basis of the reliability when a surrounding area of the predicted route of the moving device is divided into a plurality of cells and determines the traffic participant distance on the basis of the magnitudes of the cost values.

According to this route determining device, magnitudes of cost values of a plurality of cells are calculated on the basis of the reliability when a surrounding area of the predicted route of the moving device is divided into a plurality of cells, and the traffic participant distance is determined on the basis of the magnitudes of the cost values, whereby the traffic participant distance can be determined in a rapid manner.

According to an embodiment of the disclosure, in the route determining device described above, the predetermined control algorithm may be an algorithm to which a dynamic window approach is applied.

Generally, compared to the other techniques, the dynamic window approach has characteristics of being capable of shortening a time required for determining a route of the moving device and reducing a calculation load. Therefore, according to this route determining device, by using an algorithm to which the dynamic windows approach is applied, the route of the moving device can be determined while realizing shortening of a time required for determining the route and reduction of the calculation load.

According to another embodiment, there is provided a robot including: the route determining device described above; a movement mechanism; and a control unit that controls the movement mechanism such that the robot moves along a route determined by the route determining device.

According to this robot, smooth movement to a destination can be achieved while avoiding an interference with traffic participants.

BRIEF DESCRIPTION OF THE DRAWINGS

FIG. 16 is a block diagram illustrating the function of a route determining device and the like.

DESCRIPTION OF THE EMBODIMENTS

Figure 1:
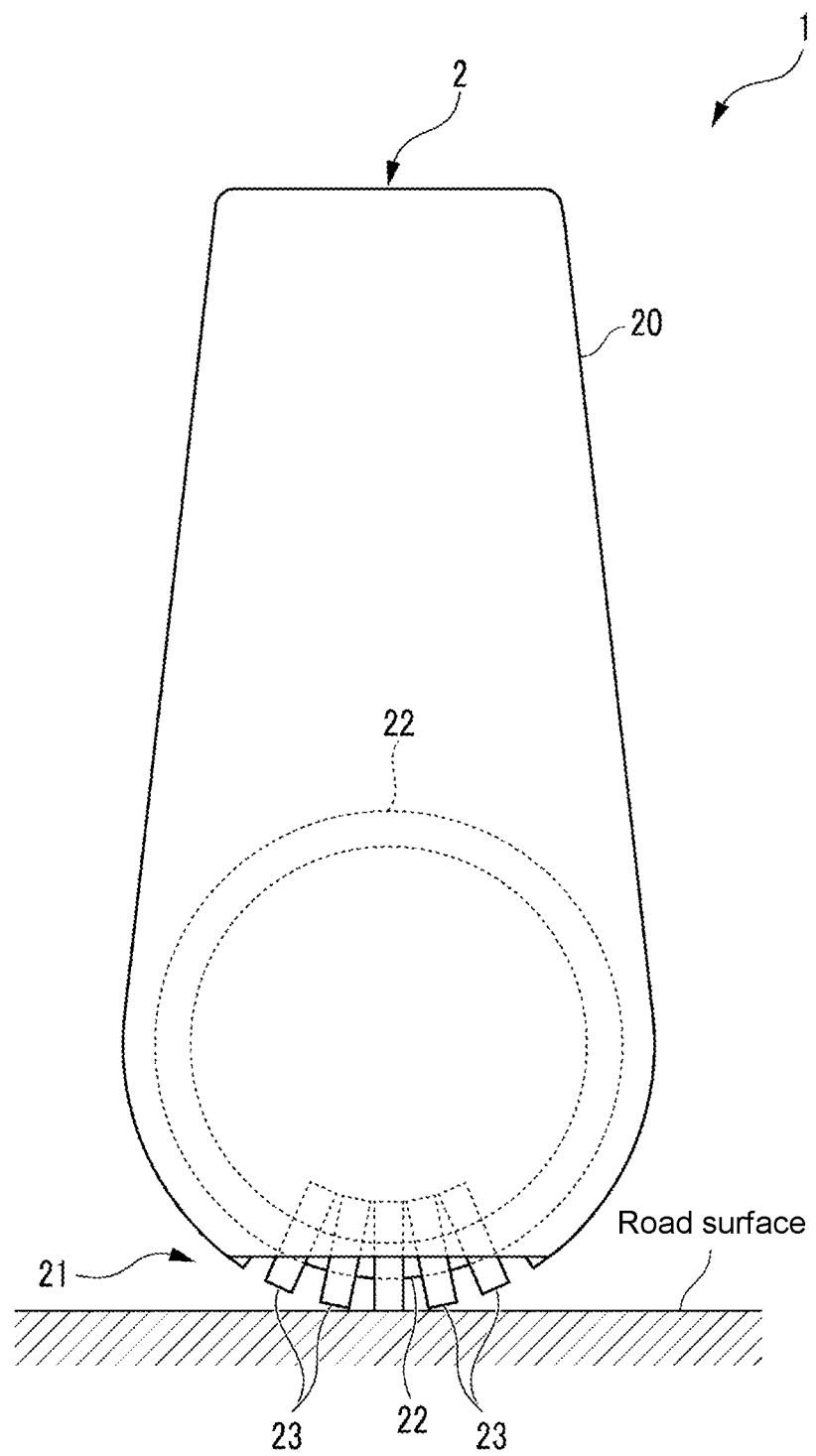
FIG. 1 is a diagram illustrating an external appearance of a robot to which a route determining device according to one embodiment of the present disclosure is applied.

Hereinafter, a route determining device according to one embodiment of the disclosure will be described with reference to the drawings. As illustrated in FIG. 1, the route determining device 1 according to this embodiment is applied to an inverted pendulum-type robot 2 as a moving device and determines a route of the robot 2 under a condition in which the probability of presence of a traffic participant is high in accordance with a technique to be described later.

Figure 2:
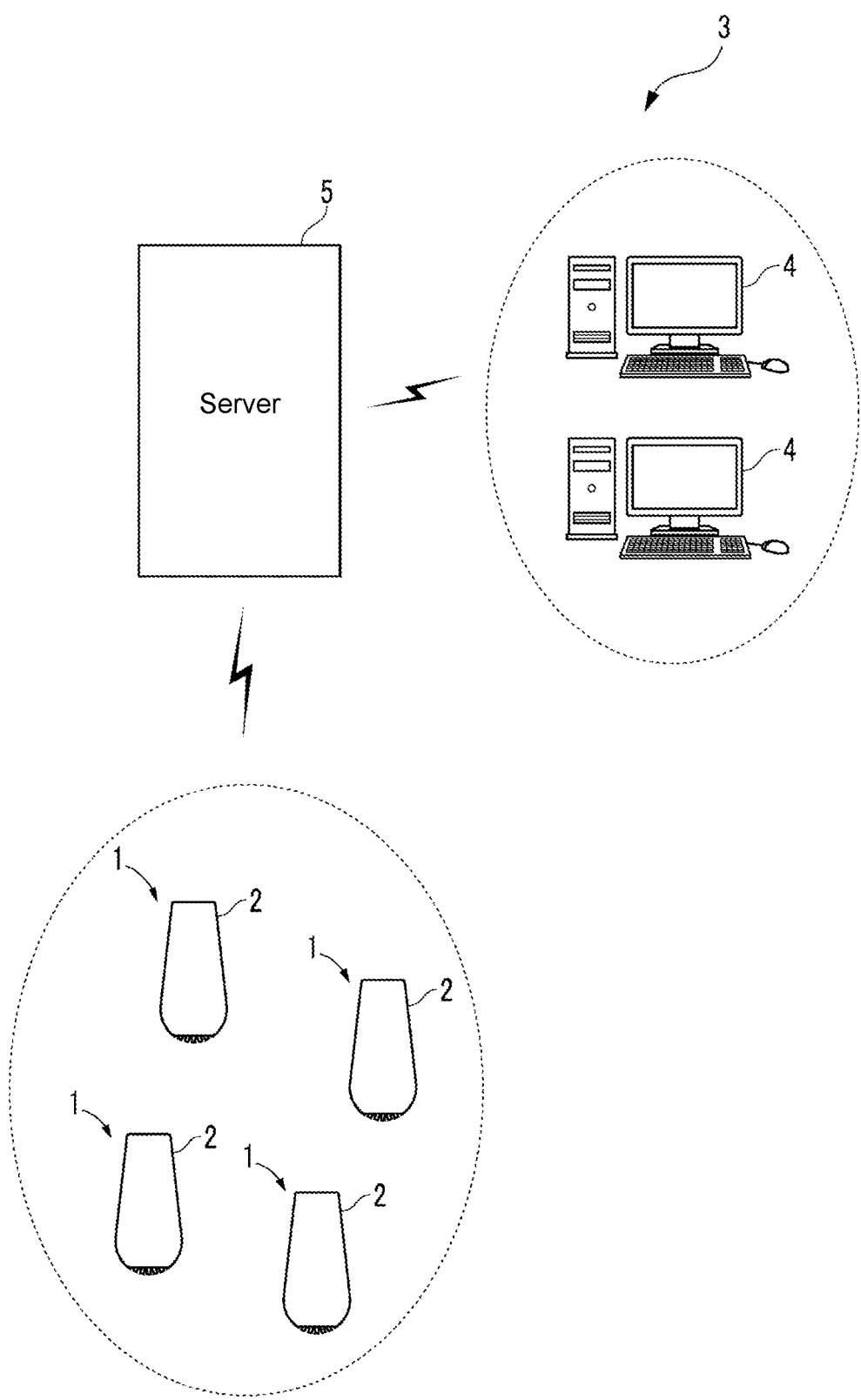
FIG. 2 is a diagram illustrating the configuration of a guide system using a robot.

This robot 2 is an autonomous movement type and is used in a guide system 3 illustrated in FIG. 2. This guide system 3 is a type in which the robot 2 guides a user to a destination (for example, a store or a boarding gate) while leading the user at a shopping mall, an airport, or the like.

As illustrated in FIG. 2, the guide system 3 includes a plurality of robots 2 that autonomously move inside a predetermined area, input devices 4 which are disposed separately from the plurality of robots 2 and to which a user's destination is input, and a server 5 that can wirelessly communicate with the robots 2 and the input devices 4.

This input device 4 is a personal computer (PC) type and, when a user's destination is input in accordance with operations of a user (or an operator) on a mouse and a keyboard, transmits a radio signal indicating the destination to the server 5. When a radio signal is received from the input device 4, the server 5 sets the user's destination or a transit point before the destination to a destination Pobj on the basis of internal map data and transmits a destination signal representing the set destination to the robot 2.

As will be described later, when a destination signal is received from the server 5 through a radio communication device 14, a control device 10 (a control unit) disposed inside the robot 2 reads a destination Pobj included in the destination signal and determines a route to the destination Pobj.

Next, the mechanical configuration of the robot 2 will be described. As illustrated in FIG. 1, the robot 2 includes a main body 20 and a movement mechanism 21 disposed in a lower part of the main body 20 and the like and is configured to be able to move on a road surface in all directions using the movement mechanism 21.

More specifically, this movement mechanism 21, for example, is configured similarly to that disclosed in Japanese Patent Laid-Open No. 2017-56763, and thus detailed description thereof will be omitted. The movement mechanism 21 includes a core body 22 having a circular ring shape, a plurality of rollers 23, a first actuator 24 (see FIG. 3), a second actuator 25 (see FIG. 3), and the like.

The plurality of rollers 23 project into the core body 22 such that they are parallel to each other at equal-angle intervals in a circumferential direction of the core body 22 (an axial core circumferential direction), and the plurality of rollers 23 are configured to be able to rotate integrally with the core body 22 around the axial core of the core body 22. In addition, each roller 23 is configured to be able to rotate around the center axis of a transverse section of the core body 22 at the disposition position of the roller 23 (an axis in the tangential direction of a circumference having the axial core of the core body 22 as its center).

The first actuator 24 is configured by an electric motor and drives the core body 22 such that it rotates around the axial core through a driving mechanism not illustrated in the drawing when a control input signal to be described later is input from the control device 10.

Similar to the first actuator 24, the second actuator 25 is also configured by an electric motor and drives the roller 23 such that it rotates around the axial core through a driving mechanism not illustrated in the drawing when a control input signal is input from the control device 10. Accordingly, the main body 20 is driven by the first actuator 24 and the second actuator 25 such that it moves on the road surface in all directions. In accordance with the configuration described above, the robot 2 can move on the road surface in all directions.

Figure 3:
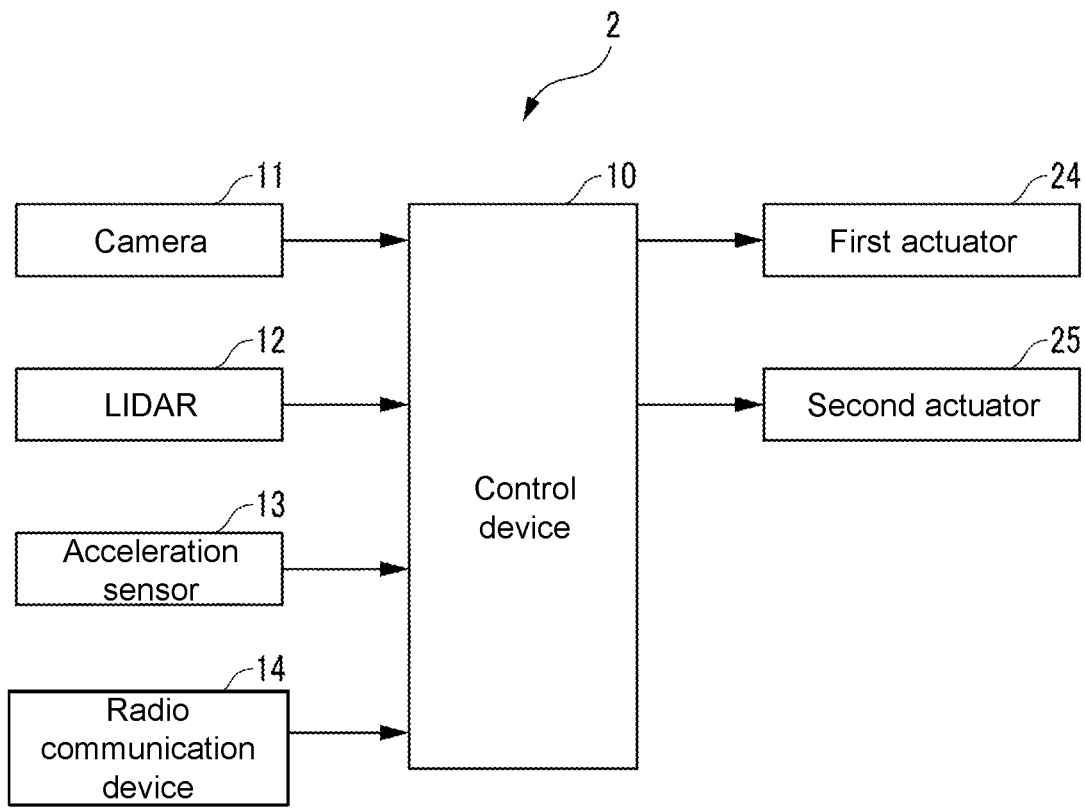
FIG. 3 is a block diagram illustrating the electrical configuration of a robot.

Next, the electrical configuration of the robot 2 will be described. As illustrated in FIG. 3, the robot 2 further includes a control device 10, a camera 11, a LIDAR 12, an acceleration sensor 13, and a radio communication device 14.

This control device 10 (a control unit) is configured by a microcomputer formed by a CPU, a RAM, a ROM, an E2PROM, an I/O interface, various electric circuits (all not illustrated in the drawing), and the like. In this E2PROM, map data of places at which the robot 2 guides and a convolutional neural network (CNN) are stored. In this case, as the CNN, a CNN of which model parameters, in other words, a weighting factor of a coupling layer and a bias term have been sufficiently learned by a learning device 30 to be described later is stored.

The camera 11 images a surrounding environment of the robot 2 and outputs an image signal representing the surrounding environment to the control device 10. The LIDAR 12 measures a distance to a target object and the like in the surrounding environment using laser light and outputs a measurement signal representing the distance and the like to the control device 10. The acceleration sensor 13 detects an acceleration of the robot 2 and outputs a detection signal representing the acceleration to the control device 10.

The control device 10 estimates the own position of the robot 2 using an adaptive Monte Carlo localization (amlc) technique using the image signal of the camera 11 and the measurement signal of the LIDAR 12 described above. In addition, the control device 10 calculates an x-axis velocity v_x and a y-axis velocity v_y of the robot 2 to be described later on the basis of the measurement signal of the LIDAR 12 and the detection signal of the acceleration sensor 13.

The radio communication device 14 is electrically connected to the control device 10, and the control device 10 executes radio communication with the server 5 through the radio communication device 14.

Figure 4:
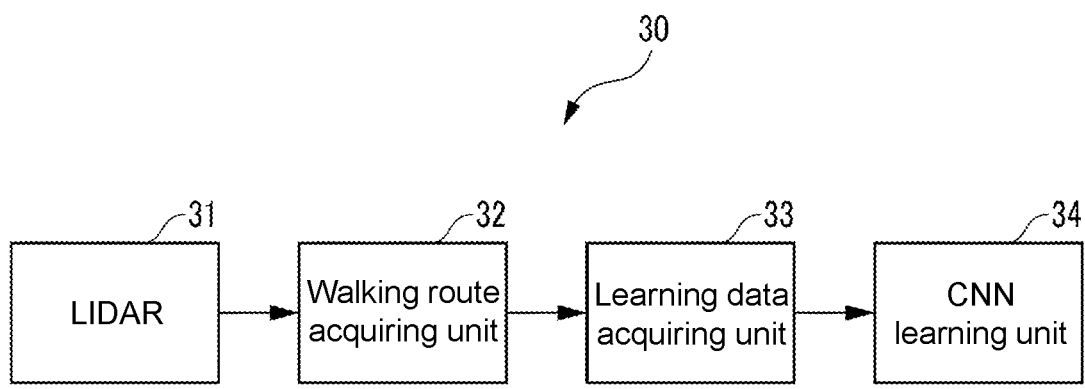
FIG. 4 is a block diagram illustrating the configuration of a learning device.

Next, the configuration of the route determining device 1 and the principle of a route determining method according to this embodiment will be described. First, the learning device 30 illustrated in FIG. 4 will be described. This learning device 30 is used for executing learning of model parameters (a weighting factor of a coupling layer and a bias term) of the CNN to be described later and the like and includes a LIDAR 31, a walking route acquiring unit 32, a learning data acquiring unit 33, and a CNN learning unit 34. More specifically, such constituent elements 32 to 34 are configured by a controller not illustrated in the drawing and the like.

Figure 5:
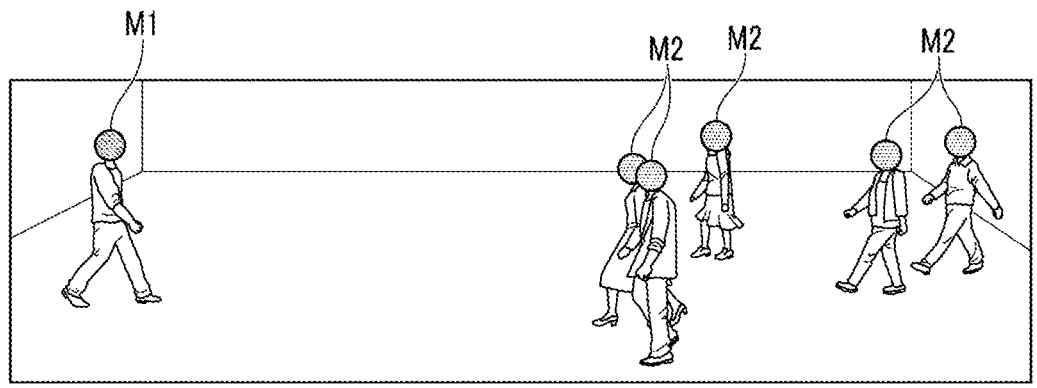
FIG. 5 is a perspective view when a walking route of a first pedestrian is acquired.

First, in order to learn a walking route of a general pedestrian, as illustrated in FIG. 5, in a case in which a first pedestrian M1 is set as a reference pedestrian, and this first pedestrian M1 walks from a walking start point Ps (see FIG. 6) to a destination Po (see FIG. 6), a congested traffic environment in which a plurality of second pedestrians M2 are present in an irregular arrangement in an advancement direction at the time of starting walking is set.

Next, changes in the position when the first pedestrian M1 actually walks from the walking start point Ps to the destination Po and changes in the positions of the plurality of second pedestrians M2 are measured using the LIDAR 31, and results of the measurements are output to the walking route acquiring unit 32.

Figure 6:
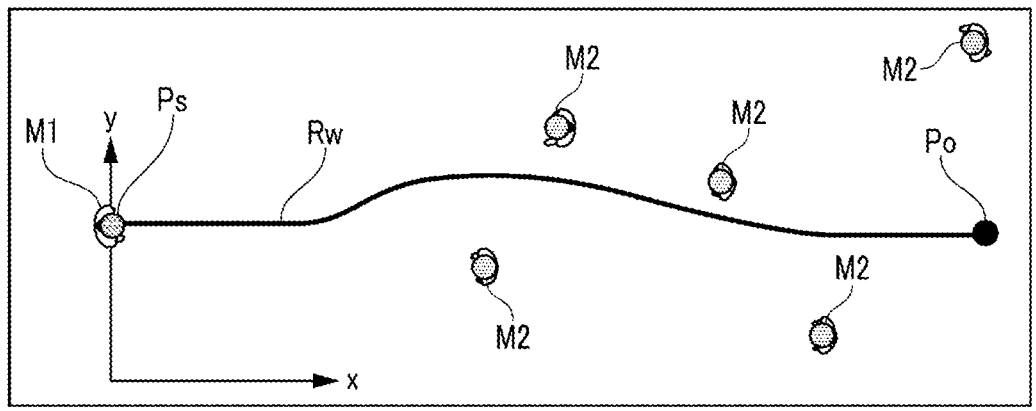
FIG. 6 is a diagram illustrating one example of a result of acquisition of the walking route illustrated in FIG. 5.

Then, the walking route acquiring unit 32 sequentially acquires and stores a walking route Rw from the walking start point Ps of the first pedestrian M1 to the destination Po on the basis of results of the measurements acquired by the LIDAR 31, for example, as illustrated in FIG. 6. As illustrated in the drawing, when an axis extending in the advancement direction of the first pedestrian M1 is defined as an x axis, and an axis orthogonal to the advancement direction of the first pedestrian M1 is defined as a y axis, the walking route Rw of the first pedestrian M1 is acquired as two-dimensional x-y coordinate values. In the following description, the definitions of the x axis and they axis are the same as those of FIG. 6.

The origin of this x axis is set to the walking start point Ps of the first pedestrian M1, and the origin of they axis is set to a predetermined position on the right side in the advancement direction of the first pedestrian M1. In addition, the position of the second pedestrian M2 before the first pedestrian M1 arrives at the destination Po from the walking start point Ps of the first pedestrian M1 is acquired in the state of being associated with the walking route Rw of the first pedestrian M1 by the walking route acquiring unit 32.

Figure 7:
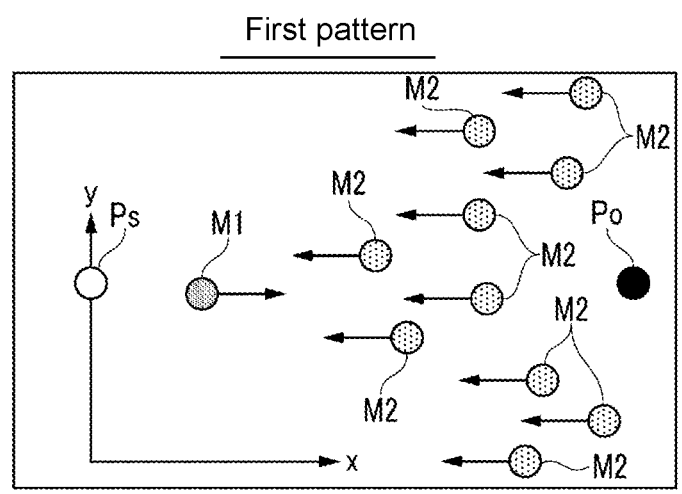
FIG. 7 is a diagram illustrating a first pattern of an arrangement of second pedestrians when the acquisition of a walking route starts.
Figure 8:
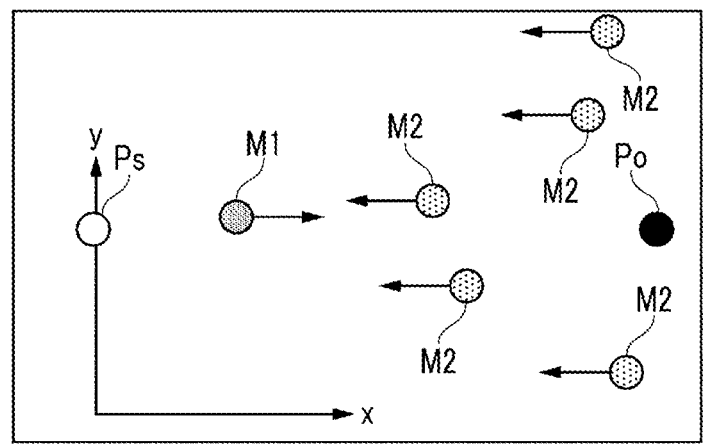
FIG. 8 is a diagram illustrating a second pattern of an arrangement of second pedestrians.

In addition to this, the walking route Rw of the first pedestrian M1 is acquired by the walking route acquiring unit 32 while switching a walking pattern of the second pedestrian M2 to first to seventh patterns illustrated in FIGS. 7 to 13. In this case, as illustrated in FIGS. 7 and 8, the first and second patterns are patterns in which ten and five second pedestrians M2 respectively walk toward the first pedestrian M1 side parallel to the x axis while some thereof pass the first pedestrian M1.

Figure 9:
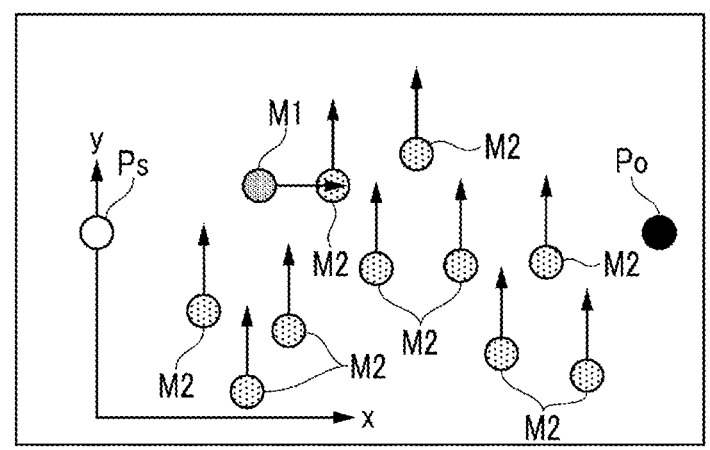
FIG. 9 is a diagram illustrating a third pattern of the arrangement of the second pedestrian.
Figure 10:
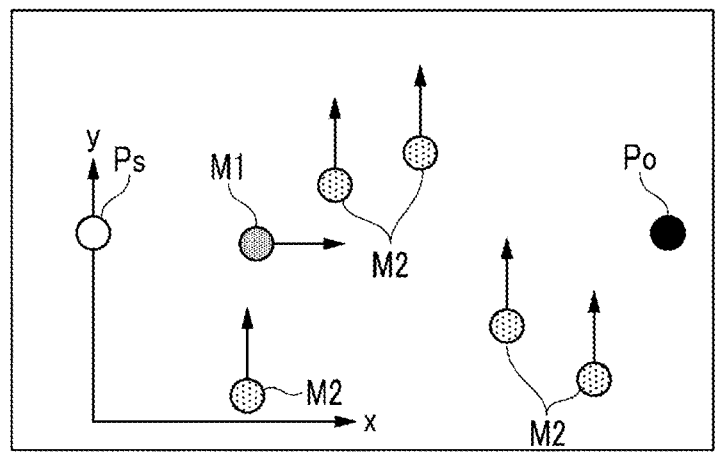
FIG. 10 is a diagram illustrating a fourth pattern of the arrangement of the second pedestrian.
Figure 11:
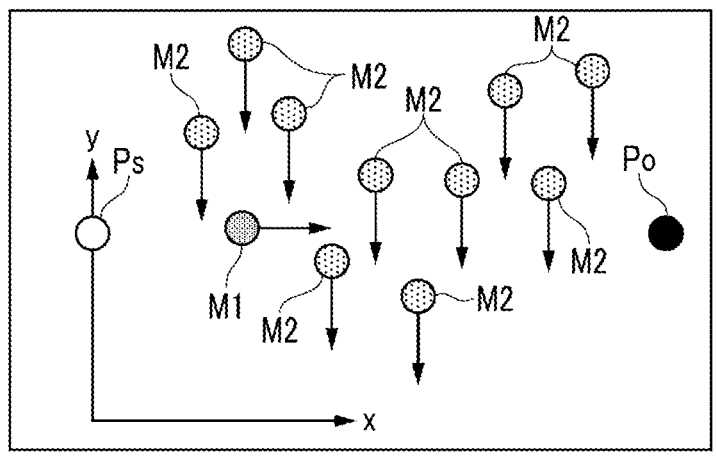
FIG. 11 is a diagram illustrating a fifth pattern of the arrangement of the second pedestrian.
Figure 12:
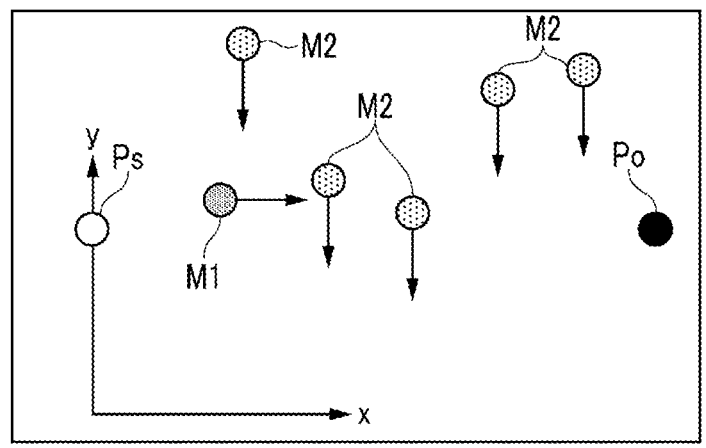
FIG. 12 is a diagram illustrating a sixth pattern of the arrangement of the second pedestrian.

In addition, as illustrated in FIGS. 9 and 10, the third and fourth patterns are patterns in which ten and five second pedestrians M2 walk from the right side to the left side of the first pedestrian M1 while some thereof pass the first pedestrian M1. Furthermore, as illustrated in FIGS. 11 and 12, the fifth and sixth patterns, opposite to the third and fourth patterns, are patterns in which ten and five second pedestrians M2 walk from the left side to the right side of the first pedestrian M1 while some thereof pass the first pedestrian M1.

Figure 13:
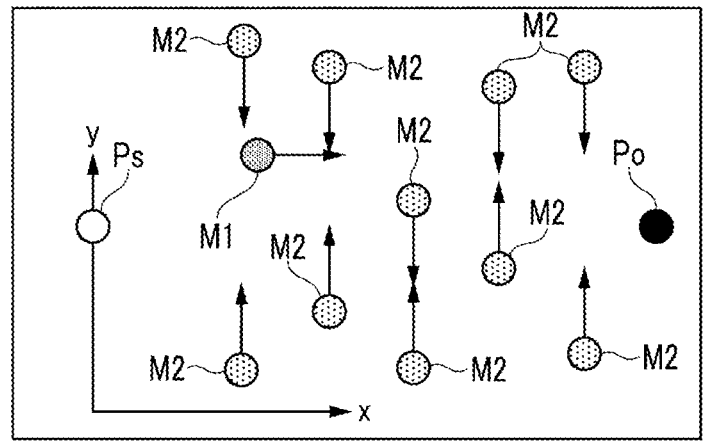
FIG. 13 is a diagram illustrating a seventh pattern of the arrangement of the second pedestrian.

In addition, the seventh pattern, as illustrated in FIG. 13, is a pattern in which five second pedestrians M2 out of ten second pedestrians walk from the right side to the left side of the first pedestrian M1, and the remaining five second pedestrians M2 walk from the left side to the right side of the first pedestrian M1, and some thereof walk by passing the first pedestrian M1.

As described above, the walking route acquiring unit 32 acquires the walking route Rw of the first pedestrian M1 in the state of being associated with the positions of the second pedestrians M2 and outputs a result of the acquisition to the learning data acquiring unit 33.

When the result of the acquisition such as the walking route Rw is input from the walking route acquiring unit 32, the learning data acquiring unit 33 acquires and generates learning data using a technique to be described below on the basis of the result of the acquisition. First, under a simulation environment of a gazebo simulator or the like, virtual second pedestrians M2' (see FIG. 14) corresponding to the second pedestrians M2 described above and a virtual robot (not illustrated in the drawing) corresponding to the robot 2 are generated.

Next, while the virtual robot is moved along the walking route Rw of the first pedestrian M1 described above, the virtual second pedestrians M2' are moved in accordance with the positions of the second pedestrians M2 acquired by the walking route acquiring unit 32.

Figure 14:
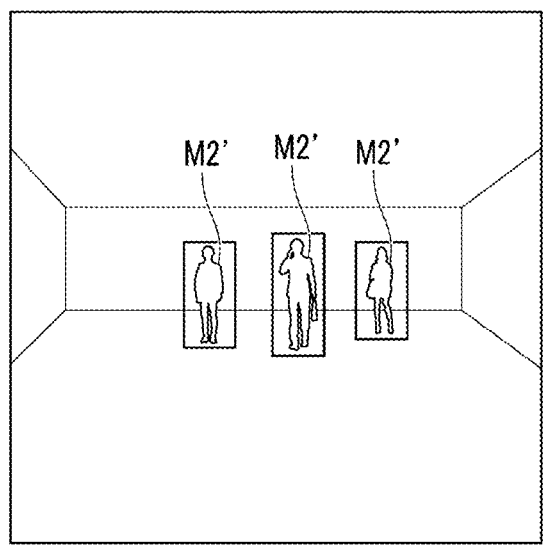
FIG. 14 is a diagram illustrating an image at a virtual robot viewpoint under a simulation environment.
Figure 15:
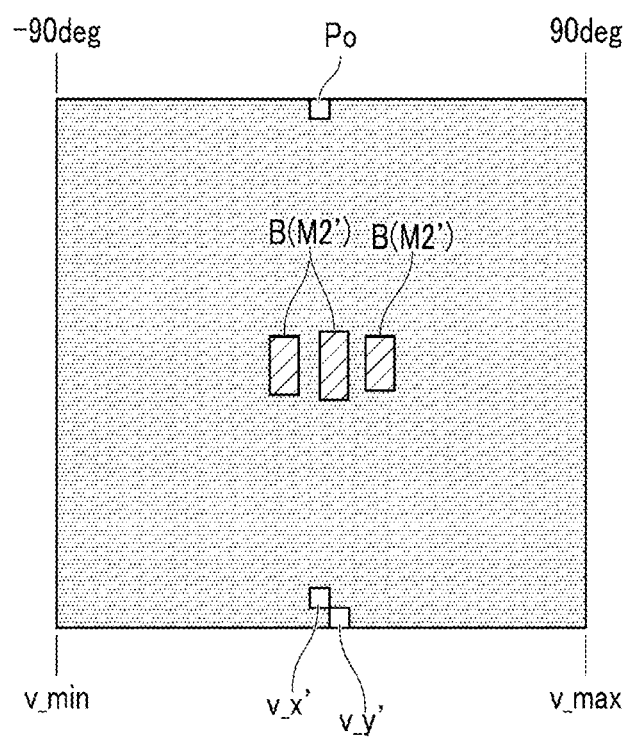
FIG. 15 is a diagram illustrating a mask image generated from the image illustrated in FIG. 14.

During the movement, an image of a visual environment of a side in front of the virtual robot is sampled at predetermined time intervals, and mask images are sequentially generated on the basis of results of the sampling using a single shot multibox detector (SSD) technique. For example, as illustrated in FIG. 14, in a case in which three virtual second pedestrians M2' are positioned on a side in front of the virtual robot under a simulation environment, by acquiring the positions of the three virtual second pedestrians M2' using the SSD technique, a mask image illustrated in FIG. 15 is generated.

As illustrated in the drawing, the positions of the three virtual second pedestrians M2' are displayed as three rectangular boxes B in this mask image. In the drawing, areas of the three boxes B denoted by broken lines are actually displayed in red, and the other areas denoted by dot drawing are actually displayed in black.

Simultaneously with this, a destination Po at the time of sampling is displayed as a white rectangular box at an upper end of the mask image. This destination Po is set as a value in a range between −90 degrees and 90 degrees when a center position on a side in front at the time of setting the own position of the virtual robot at the current time point as the reference is set as 0 degrees.

In addition, a virtual x-axis velocity v_x' and a virtual y-axis velocity v_y' of the virtual robot at the time of sampling are displayed as two rectangular white boxes at a lower end of this mask image. The virtual x-axis velocity v_x' and the virtual y-axis velocity v_y' are respectively velocity components of the virtual robot in the x-axis direction and the y-axis direction and are set as values within a range between a minimum movement velocity v_min (for example, a value "0") and a maximum movement velocity v_max of the virtual robot. The x-axis direction and the y-axis direction of the virtual robot in this case are defined as in FIG. 7 and the like described above.

In addition to this, the learning data acquiring unit 33 sets a movement direction command of the virtual robot at the time of sampling as a vector value having three directions including a "leftward direction", a "center direction", and a "rightward direction" as its elements. In the case of this movement direction command, for example, when the virtual robot is moving straight ahead, the "center direction" is set to a value "1", and the "leftward direction" and the "rightward direction" other than that are set to a value "0".

In addition, when the virtual robot is moving in the rightward direction, the "rightward direction" is set to a value "1", and the other directions are set to a value "0". In this case, the "rightward direction" is set to the value "1" when the virtual robot moves in the direction to the right side having a predetermined angle θ or more with respect to the straight ahead movement direction. In addition, when the virtual robot is moving in the leftward direction, the "leftward direction" is set to a value "1", and the other directions are set to a value "0". In this case, the "leftward direction" is set to the value "1" when the virtual robot moves in the direction to the left side having a predetermined angle θ or more with respect to the straight ahead movement direction.

Next, the learning data acquiring unit 33 sequentially generates the mask image (see FIG. 15) and the movement direction command described above associated with each other as one set of data as learning data at the predetermined time intervals described above. Finally, such learning data is output to the CNN learning unit 34 at a timing at which many sets (for example, several thousands of sets or more) of learning data have been generated. In addition, the learning data acquiring unit 33 may be configured to output the learning data to the CNN learning unit 34 every time the learning data is generated at predetermined time intervals.

When many sets of learning data are input from the learning data acquiring unit 33, the CNN learning unit 34 executes learning of model parameters of the CNN using such learning data. More specifically, a mask image of one set of learning data is input to the CNN, and a movement direction command is used as teacher data for an output of the CNN at that time.

In this case, an output layer of the CNN is configured by three units, and a command (hereinafter, referred to as a "CNN output command") having three softmax values from such three units as its elements is output from the CNN. This CNN output command is configured by commands having three directions ("leftward direction", "center direction", and "rightward direction"), which are the same as those of the movement direction command, as its elements.

Next, the weighing factor and the bias term of the coupling layer of the CNN are calculated using a gradient method using loss functions (for example, a mean squared error) of the movement direction command and the CNN output command. In other words, learning calculation of the model parameters of the CNN is executed. Thus, by executing the learning calculation described above corresponding to the number of sets (in other words, several thousands of times) of learning data, the learning calculation of model parameters of the CNN that is performed by the CNN learning unit 34 ends.

In addition, the CNN learning unit 34 executes learning of the reliability P of the output of the CNN as described below using the CNN that has completed learning calculation of model parameters. More specifically, by using a dropout technique, a relation between the standard deviation σ and the reliability P of the output of the CNN is sufficiently inferred and calculated, and the calculation data is sampled.

Then, by applying a regression analysis algorithm such as a least squares method to the calculation data of the standard deviation σ and the reliability P of the output of the CNN that have been sampled, Equations (6) and (7) to be described later thereby are derived. As described above, the learning device 30 executes learning of model parameters of the CNN and the learning of the reliability P of the output of the CNN.

Figure 16:
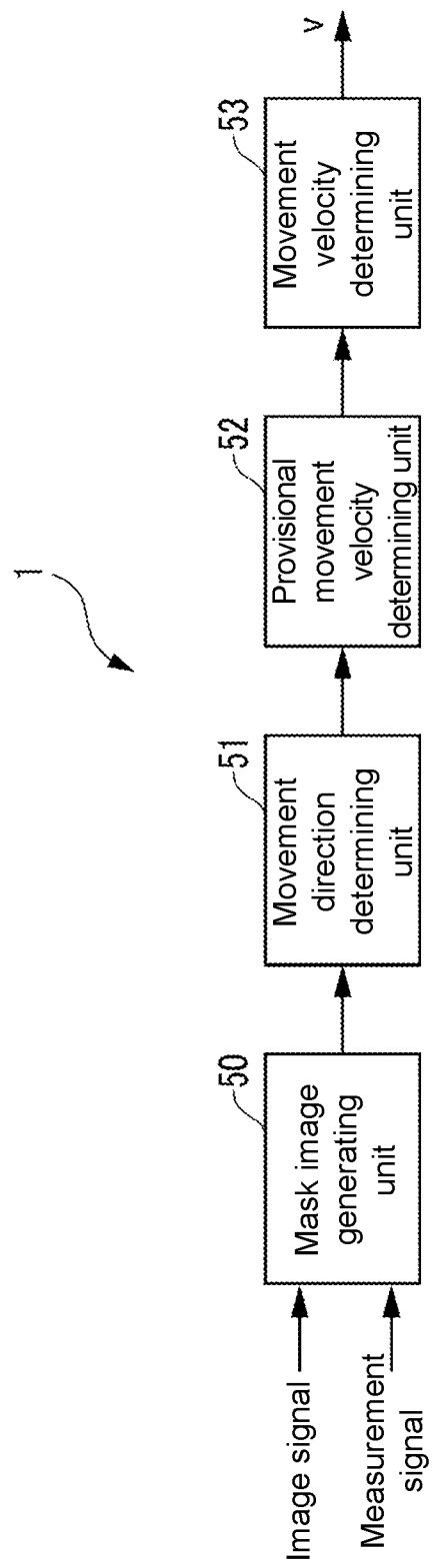

Next, the configuration of the route determining device 1 and the like according to this embodiment will be described with reference to FIG. 16. The route determining device 1 determines (calculates) a movement velocity command v as a route of the robot 2 using a technique described below, and this movement velocity command v has a target x-axis velocity v_x_cmd and a target y-axis velocity v_y_cmd that are targets of the x-axis velocity v_x and the y-axis velocity v_y of the robot 2 as its elements.

As illustrated in the drawing, the route determining device 1 includes a mask image generating unit 50, a movement direction determining unit 51, a provisional movement velocity determining unit 52, and a movement velocity determining unit 53, and more specifically, such components 50 to 53 are configured by the control device 10. Various control processes described below are assumed to be executed using a predetermined control period ΔT.

First, the mask image generating unit 50 will be described. When an image signal from the camera 11 and a measurement signal from the LIDAR 12 are input, this mask image generating unit 50 generates a mask image using the SSD technique described above.

In this mask image, similar to the boxes B of the mask image illustrated in FIG. 15 described above, a box (not illustrated in the drawing) of a traffic participant present on a side in front is displayed, and an x-axis velocity v_x and a y-axis velocity v_y, and a destination Pobj (all not illustrated in the drawing) of the robot 2 are displayed instead of the virtual x-axis velocity v_x', the virtual y-axis velocity v_y', and the destination Po.

In this case, the position and the size of the traffic participant are determined on the basis of an image signal from the camera 11 and a measurement signal from the LIDAR 12. In addition, the x-axis velocity v_x and the y-axis velocity v_y of the robot 2 are determined on the basis of a measurement signal from the LIDAR 12 and a detection signal from the acceleration sensor 13. Furthermore, the destination Pobj is determined using a destination signal from the server 5. The mask image generated as described above is output from the mask image generating unit 50 to the movement direction determining unit 51.

The movement direction determining unit 51 includes a CNN (not illustrated in the drawing) that has learned model parameters using the CNN learning unit 34 described above and determines a movement direction of the robot 2 as below using this CNN.

First, when a mask image from the mask image generating unit 50 is input to the CNN, the movement direction determining unit 51 outputs the CNN output command described above from the CNN. Next, a direction of an element having the maximum value among three elements ("leftward direction", "center direction", and "rightward direction") of the CNN output command is determined as the movement direction of the robot 2. Then, the movement direction of the robot 2 determined as described above is output from the movement direction determining unit 51 to the provisional movement velocity determining unit 52.

This provisional movement velocity determining unit 52 calculates a provisional movement velocity command v_cnn on the basis of the movement direction of the robot 2 from the movement direction determining unit 51 and the x-axis velocity v_x and the y-axis velocity v_y of the robot 2. This provisional movement velocity command v_cnn has a provisional value v_x_cnn of the x-axis velocity and a provisional value v_y_cnn of the y-axis velocity of the robot 2 as its elements. Next, the provisional movement velocity command v_cnn of the robot 2 determined as described above is output from the provisional movement velocity determining unit 52 to the movement velocity determining unit 53.

This movement velocity determining unit 53 determines a movement velocity command v using an algorithm to which a dynamic window approach (DWA) is applied on the basis of the provisional movement velocity command v_cnn. This movement velocity command v has a target x-axis velocity v_x_cmd and a target y-axis velocity v_y_cmd as its elements and is determined in a dynamic window. In addition, such two velocities v_x_cmd and v_y_cmd are used as target values of the x-axis velocity and the y-axis velocity of the robot 2 in a movement control process to be described later.

More specifically, the movement velocity command v is determined such that a target function G(v) defined as represented in the following Equation (1) has a maximum value.

$$G(v)=\alpha \cdot cnn(v)+\beta \cdot dist(v) \quad (1)$$

α and β represented in Equation (1) presented above are predetermined weighting parameters and are determined on the basis of dynamic characteristics of the robot 2. In addition, cnn(v) Equation (1) presented above is a function calculated using the following Equation (2).

$$cnn(v)=\exp(-\|v\_cnn-v\|) \quad (2)$$

In addition, dist(v) represented in Equation (1) presented above is a distance function value representing a distance between the robot 2 and a traffic participant (obstacle) that approaches the robot 2 the most when the robot 2 is assumed to move at the provisional value v_x_cnn of the x-axis velocity and the provisional value v_y_cnn of the y-axis velocity, and this distance function value dist(v) is calculated using a cost map technique to be described below.

First, the advancement direction of the robot 2 is acquired from the provisional movement velocity command v_cnn described above, and a plurality of cells is set in a surrounding area in the advancement direction. Then, a cost value C_Value of each cell is calculated using the following Equations (3) and (4).

$$\text{when } d<r\_inf: C\_\text{Value}=d/r\_inf \quad (3)$$

$$\text{when } d \geq r\_inf: C\_\text{Value}=1 \quad (4)$$

d in Equation (3) presented above is a shortest distance to the traffic participant in each cell. In addition, r_inf is an influence range parameter used for determining an influence range of the cost from a traffic participant in a dynamic window and is calculated using a weighted average calculation equation represented in the following Equation (5).

$$r\_inf=r\_\max \cdot (1-P(\sigma))+r\_\min \cdot P(\sigma) \quad (5)$$

In this Equation (5), r_max and r_min are respectively a predetermined maximum value and a predetermined minimum value of the influence range parameter and are determined on the basis of the dynamic characteristics of the robot 2. In addition, P(σ) is reliability learned by the CNN learning unit 34 described above and is calculated using the following Equations (6) and (7).

$$\text{when } \sigma_i<T_i: P(\sigma)=a_i \cdot \sigma_i+b_i \quad (6)$$

when $\sigma_i \geq T_i$: $P(\sigma)=0$        (7)

In Equation (6) described above, σi, as described above, is a standard deviation of the CNN output (Softmax value) when an inference operation is executed N times by the CNN learning unit 34. In addition, i is an estimation class, and a maximum voting class when the inference operation is executed N times is assigned thereto. Furthermore, ai and bi are model parameters derived using a regression analysis algorithm. In addition, Ti is a maximum value of $\sigma_i$ of each class.

The cost value C_Value of each cell is calculated using Equations (3) to (7) described above, and a distance to the traffic participant from a cell having the highest cost value C_Value is set to the distance function value dist(v) described above in a result of the calculation.

The distance function value dist(v) is calculated using the technique described above and thus is calculated to have a larger value as the reliability P(σ) of the CNN output, in other words, the provisional movement velocity command v_cnn becomes higher. In other words, the influence range parameter r_inf is calculated using the weighted average calculation equation of Equation (5) presented above and thus is calculated to have a smaller value as the reliability P(σ) of the provisional movement velocity command v_cnn becomes higher. On the other hand, as is apparent by referring to Equation (3) represented above, the cost value C_Value is calculated as a larger value as the influence range parameter r_inf becomes smaller.

As a result, the cost value C_Value is calculated as a larger value as the reliability P(σ) of the provisional movement velocity command v_cnn becomes higher. In other words, the distance function value dist(v) is calculated as a larger value as the reliability P(σ) of the provisional movement velocity command v_cnn becomes higher.

In accordance with the reasons described above, under a condition in which the reliability P(σ) of the provisional movement velocity command v_cnn is high, the first term of the right side does not need to be increased in accordance with an increase in the second term of the right side of Equation (1) described above, and the movement velocity command v is determined such that v=v_cnn is satisfied. In other words, under a condition in which the reliability P(σ) of the provisional movement velocity command v_cnn that is an CNN output is high, the provisional movement velocity command v_cnn is directly calculated as the movement velocity command v.

Figure 18:
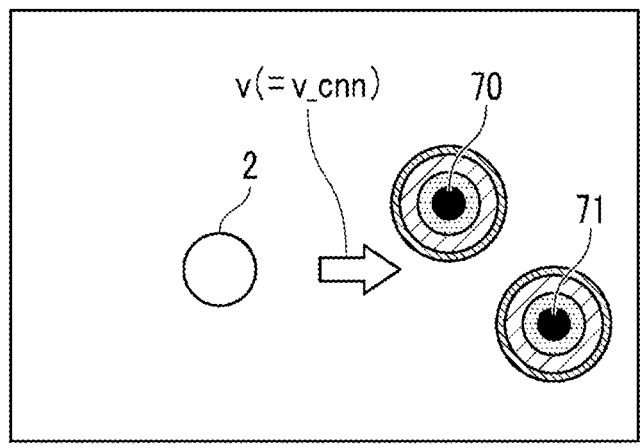
FIG. 18 is a diagram illustrating determination of a route when the reliability of a provisional movement velocity command is high.

For example, as illustrated in FIG. 18, in a case in which two traffic participants (pedestrians) 70 and 71 are present in the advancement direction of the robot 2, v=v_cnn is satisfied when the reliability P(σ) of the provisional movement velocity command v_cnn that is the CNN output is high.

Figure 17:
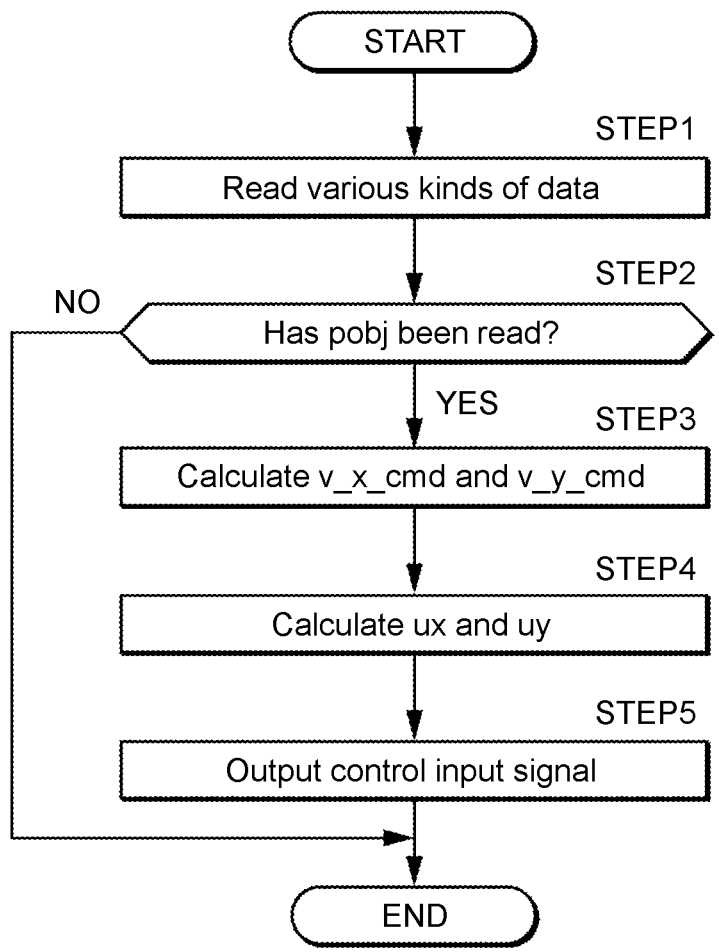
FIG. 17 is a flowchart illustrating a movement control process.
Figure 19:
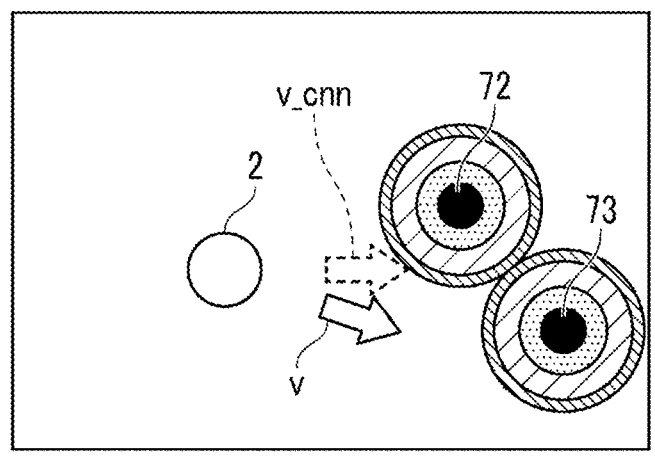
FIG. 19 is a diagram illustrating determination of a route when the reliability of a provisional movement velocity command is low.

On the other hand, as illustrated in FIG. 19, in a case in which two traffic participants 72 and 73 are present in the advancement direction of the robot 2, under a condition in which the reliability P(σ) of the provisional movement velocity command v_cnn is low, the movement velocity command v is calculated as a command for a direction different from the provisional movement velocity command v_cnn. In such a case, in both FIGS. 17 and 18, areas (areas denoted using hatching) represented by a plurality of circles having different radiuses represent influence ranges of costs from the pedestrian, and this influence range is a larger range as the influence range parameter r_inf becomes larger.

In this embodiment, the movement direction determining unit 51 and the provisional movement velocity determining unit 52 correspond to a predicted route determining unit, and the provisional movement velocity command v_cnn corresponds to a predicted route. In addition, the movement velocity determining unit 53 corresponds to a reliability calculating unit, a distance determining unit, and a route determining unit, and the movement velocity command v corresponds to a velocity of a moving device and a route of the moving device. In addition, the distance function value dist corresponds to a traffic participant distance, and the standard deviation σ corresponds to a variation parameter.

In the route determining device 1 according to this embodiment, as described above, the movement velocity command v having the target x-axis velocity v_x_cmd and the target y-axis velocity v_y_cmd as its elements is determined.

Next, a movement control process will be described with reference to FIG. 17. This movement control process is used for controlling the two actuators 24 and 25 of the movement mechanism 21 such that the robot 2 moves at the two target velocities v_x_cmd and v_y_cmd described above and is executed at a predetermined control period ΔT by the control device 10.

As illustrated in the drawing, first, various kinds of data are read (Step 1 in FIG. 17). These various kinds of data are data of signals input from the camera 11, the LIDAR 12, the acceleration sensor 13, and the radio communication device 14 described above to the control device 10.

Next, it is determined whether or not a destination Pobj included in a destination signal described above has been read (Step 2 in FIG. 17). When the determined result is "No" (No in Step 2 in FIG. 17), in other words, when a destination signal has not been received from the server 5, this process ends.

On the other hand, when the determination result is "Yes" (Yes in Step 2 in FIG. 17), a target x-axis velocity v_x_cmd and a target y-axis velocity v_y_cmd are calculated using the technique described above illustrated in FIG. 16 (Step 3 in FIG. 17).

Next, an x-axis control input Ux and a y-axis control input Uy are calculated using a predetermined control algorithm in accordance with the target x-axis velocity v_x_cmd and the target y-axis velocity v_y_cmd (Step 4 in FIG. 17). In this case, a feedforward control algorithm such as a map search or a feedback control algorithm may be used as the predetermined control algorithm.

Next, a control input signal corresponding to the x-axis control input Ux is output to the first actuator 24, and a control input signal corresponding to the y-axis control input Uy is output to the second actuator 25 (Step 5 in FIG. 17). Thereafter, the process ends. In this way, the actual x-axis velocity v_x and the actual y-axis velocity v_y of the robot 2 are controlled such that the velocities become the target x-axis velocity v_x_cmd and the target y-axis velocity v_y_cmd. As a result, the robot 2 moves toward the destination Pobj while avoiding traffic participants present on a side in front along a route set by the target velocities v_x_cmd and v_y_cmd.

As above, according to the route determining device 1 of this embodiment, a provisional movement velocity command v_cnn is determined such that an interference between the robot 2 and traffic participants is avoided using the CNN. In addition, the reliability P(σ) of the provisional movement velocity command v_cnn is calculated, and a distance function value dist(v) representing a distance between the robot 2 and a traffic participant closest to the robot 2 when the robot 2 is assumed to move from the current position in accordance with the provisional movement velocity command v_cnn is determined in accordance with the reliability $P(\sigma)$.

Then, the movement velocity command v of the robot 2 is determined using the DWA such that a target function G(v) including the distance function value dist(v) and the movement velocity command v of the robot 2 as independent variables has a maximum value. In this way, the movement velocity command v of the robot 2 is determined using the distance dist(v) determined in accordance with the reliability $P(\sigma)$ of the provisional movement velocity command v_cnn. Accordingly, when the reliability $P(\sigma)$ of the provisional movement velocity command v_cnn is high, the movement velocity command v of the robot 2 is determined to be the provisional movement velocity command v_cnn or a value close thereto. On the other hand, when the reliability $P(\sigma)$ of the provisional movement velocity command v_cnn is low, the movement velocity command v of the robot 2 is determined to be a value different from the provisional movement velocity command v_cnn.

Accordingly, even under a traffic condition such as a congested one in which an error in the provisional movement velocity command v_cnn increases, the movement velocity command v of the robot 2 can be determined such that the robot 2 of the autonomous movement type smoothly moves to the destination while avoiding an interference with traffic participants.

In addition, the reliability $P(\sigma)$ is calculated using the modeling equation (6) defining a relation between the reliability and the standard deviation $\sigma$ of the CNN output. In this case, the standard deviation $\sigma$ of the CNN output represents variations in the output of the CNN and accordingly, corresponds to a CNN modeling error, in other words, a prediction error. Accordingly, by using the modeling equation (6) defining the relation between the standard deviation $\sigma$ and the reliability $P(\sigma)$, the reliability $P(\sigma)$ of the provisional movement velocity command v_cnn that is a CNN output can be calculated with high accuracy. In this way, the movement velocity command v of the robot 2 can be determined with high accuracy.

In addition, when a surrounding area in the advancement direction represented by the provisional movement velocity command v_cnn of the robot 2 is divided into a plurality of cells, a magnitude relation of cost values of the plurality of cells are calculated on the basis of the reliability $P(\sigma)$, and the distance function value dist(v) is determined on the basis of the magnitude relation of the cost values, whereby this distance function value dist(v) can be determined in a rapid manner. As described above, by using an algorithm to which a DWA is applied, the movement velocity command v of the robot 2 can be determined while realizing shortening of the calculation time and reduction of a calculation load.

According to the technique described above, even under a traffic condition such as a congested one in which an error in the movement direction determined using the CNN increases, the movement velocity command v corresponding to the route of the robot 2 can be determined such that the robot 2 of the autonomous movement type smoothly moves to the destination Pobj while avoiding an interference with traffic participants. In this way, the number of occurrences of the state in which traffic participants are interfered with the robot 2 can be decreased, and the marketability can be improved.

Although this embodiment is an example in which the robot 2 is used as a moving device, the moving device according to the present disclosure is not limited thereto but may be any device that moves to a destination. For example, a vehicle, a vehicle-type robot and a bipedal walking-type robot may be employed.

In addition, although the embodiment is an example in which the CNN is used as the predetermined prediction algorithm, the prediction algorithm of the present disclosure is not limited thereto, and any algorithm that can determine a predicted route that is a predicted value of the route of the robot may be used. For example, a recurrent neural network (RNN), a deep Q-network (DQN), or the like may be used as the predetermined prediction algorithm.

In addition, although this embodiment is an example in which a CNN is used as the neural network, a recurrent neural network (RNN), a deep Q-network (DQN), or the like may be used instead of this.

Although the embodiment is an example in which the standard deviation $\sigma$ is used as the variation parameter, the variation parameter according to the present disclosure is not limited thereto and may be any parameter representing variations in the output of the neural network. For example, a square mean error between an output of the neural network and an expected value thereof, in other words, a square value of the standard deviation $\sigma$ may be used.

In addition, although the embodiment is an example in which the modeling equation (6) is used as a model representing a relation between a variation parameter and reliability, the model of the present disclosure is not limited thereto but may be any model representing the relation between the variation parameter and reliability. For example, a map representing the relation between the variation parameter and the reliability may be used as the model.

Furthermore, although the embodiment is an example in which the movement mechanism 21 including the core body 22 and the plurality of rollers 23 is used as a movement mechanism, the movement mechanism of the present disclosure is not limited thereto and may be any movement mechanism that can move the robot in all the direction. For example, a movement mechanism having a configuration in which a sphere body and a plurality of rollers are combined, and the robot is moved in all the directions by driving the sphere body to rotate using such rollers may be employed.

Although the embodiment is an example in which the CNN is stored in the E2PROM of the control device 10 of the robot 2, a configuration in which the CNN is stored on the server 5 side, calculation of route determination is performed on the server 5 side and a result of the calculation is transmitted to the robot 2 may be employed.

In addition, although the embodiment is an example in which the movement velocity determining unit 53 calculates a movement velocity command v having an x-axis velocity v_x and a y-axis velocity v_y as its elements as the movement velocity of the robot 2 using the DWA technique, instead of this, the movement velocity determining unit 53 may calculate an x-axis velocity v_x and an angular velocity ω as the movement velocity of the robot 2 using the DWA technique.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A route determining device determining a route before a moving device moves to a destination under a condition in which traffic participants are present in a traffic environment before the destination, the route determining device comprising:
- a processor configured to:
  - determine a predicted route that is a result of prediction of a route of the moving device using a predetermined prediction algorithm such that an interference between the moving device and the traffic participants is avoided;
  - calculate reliability of the predicted route;
  - determine a traffic participant distance that is a distance between the moving device and the traffic participant closest to the moving device when the moving device is assumed to move from a current position along the predicted route in accordance with the reliability of the predicted route;
  - determine the route of the moving device using a predetermined control algorithm such that a target function including the traffic participant distance and a velocity of the moving device as independent variables has a maximum value; and
  - control the moving device to move along the determined route,
- wherein the processor calculates magnitudes of cost values of a plurality of cells on the basis of the reliability of the predicted route when a surrounding area of the predicted route of the moving device is divided into the plurality of cells and determines the traffic participant distance on the basis of the magnitudes of the cost values,
- wherein the processor calculates the reliability of the predicted route on the basis of a standard deviation of an output from a learning device that has executed learning of model parameters, and
- calculates a magnitude of the cost value of each of the plurality of cells as a larger value as the reliability of the predicted route becomes higher.

2. The route determining device according to claim 1, wherein the predetermined prediction algorithm is a neural network, and
wherein the processor calculates a variation parameter representing a variation in an output of the neural network and calculates the reliability using a model representing a relation between the variation parameter and the reliability.

3. The route determining device according to claim 2, wherein the predetermined control algorithm is an algorithm to which a dynamic window approach is applied.

4. The route determining device according to claim 1, wherein the predetermined control algorithm is an algorithm to which a dynamic window approach is applied.

5. A robot comprising:
- the route determining device according to claim 1;
- a movement mechanism; and
- a processor that controls the movement mechanism such that the robot moves along a route determined by the route determining device.

6. A route determining method for determining a route before a moving device moves to a destination under a condition in which traffic participants are present in a traffic environment before the destination, the route determining method comprising:
- determining a predicted route that is a predicted value of a route of the moving device using a predetermined prediction algorithm such that an interference between the moving device and the traffic participants is avoided;
- calculating reliability of the predicted route;
- determining a traffic participant distance that is a distance between the moving device and the traffic participant closest to the moving device when the moving device is assumed to move from a current position along the predicted route in accordance with the reliability; and
- determining the route of the moving device using a predetermined control algorithm such that a target function including the traffic participant distance and a velocity of the moving device as independent variables has a maximum value; and
- controlling the moving device to move along the determined route,
- wherein magnitudes of cost values of a plurality of cells are calculated on the basis of the reliability of the predicted route when a surrounding area of the predicted route of the moving device is divided into the plurality of cells and determines the traffic participant distance on the basis of the magnitudes of the cost values,
- wherein the reliability of the predicted route is calculated on the basis of a standard deviation of an output from a learning device that has executed learning of model parameters, and
- a magnitude of the cost value of each of the plurality of cells is calculated as a larger value as the reliability of the predicted route becomes higher.

7. The route determining method according to claim 6, wherein the predetermined prediction algorithm is a neural network,
wherein a variation parameter representing a variation in an output of the neural network is calculated, and
wherein the reliability is calculated using a model representing a relation between the variation parameter and the reliability.

8. The route determining method according to claim 7, wherein the predetermined control algorithm is an algorithm to which a dynamic window approach is applied.

9. The route determining method according to claim 6, wherein the predetermined control algorithm is an algorithm to which a dynamic window approach is applied.

* * * * *